UNITED STATES PATENT OFFICE.

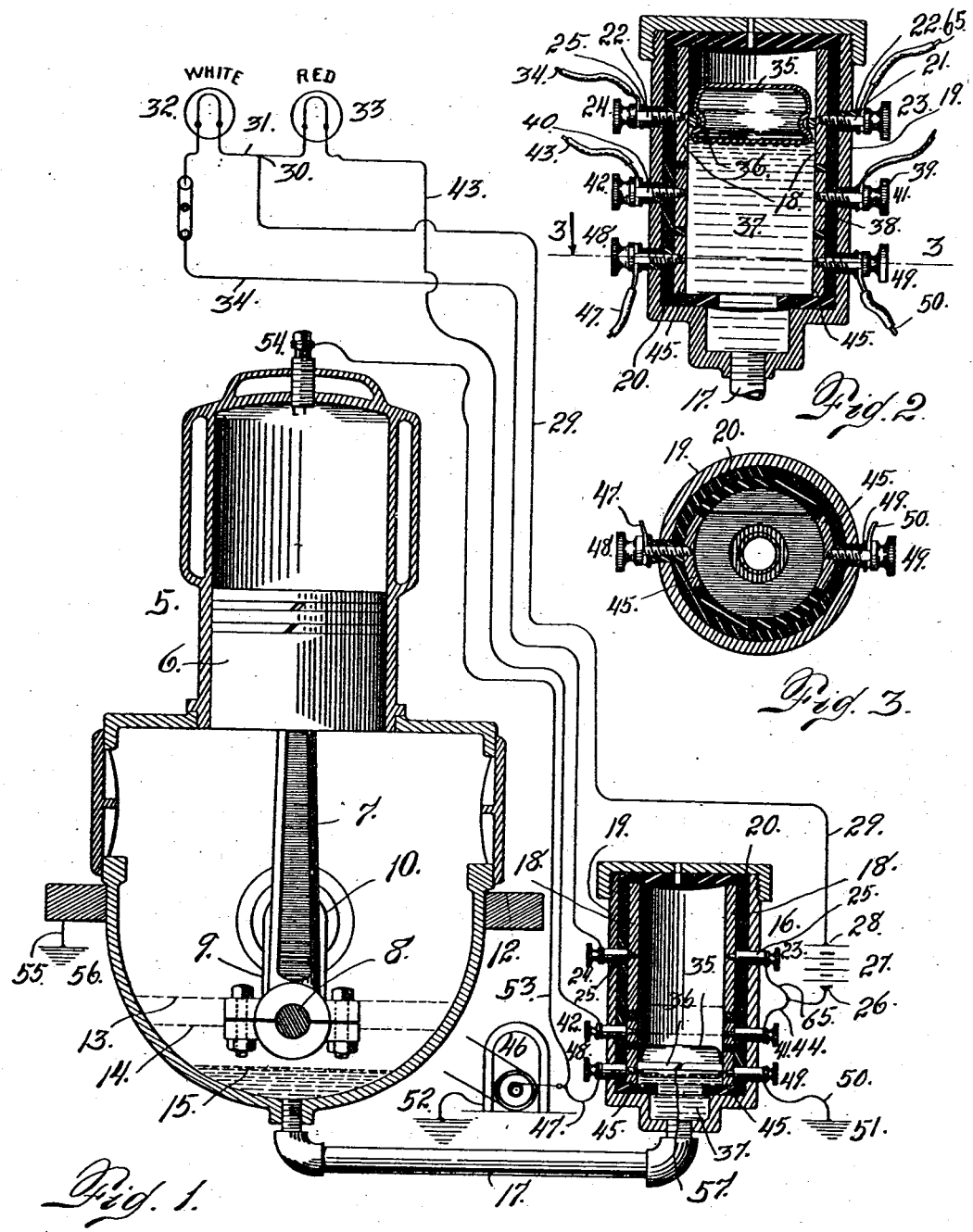

ROY J. BRADBURY, OF DENVER, COLORADO, ASSIGNOR OF TWO-FIFTHS TO ANDREW JACKSON, OF DENVER, COLORADO.

SAFETY DEVICE FOR GASOLENE-MOTORS.

1,144,101.  Specification of Letters Patent.  Patented June 22, 1915.

Application filed March 12, 1914. Serial No. 824,252.

*To all whom it may concern:*

Be it known that I, ROY J. BRADBURY, citizen of the United States, residing in the city and county of Denver and State of Colorado, have invented certain new and useful Improvements in Safety Devices for Gasolene-Motors; and I do declare the following to be a full, clear, and exact description of the invention, such as will enable others skiled in the art to which it appertains to make and use the same, reference being had to the accompanying drawings, and to the letters and figures of reference marked thereon, which form a part of this specification.

My invention relates to improvements in means for automatically indicating the amount of lubricating material in the crank case of an internal combustion engine. It is exceedingly important that the depth of oil in this case should be sufficient to allow the outer extremity of the pitman and the wrist pin of the crank to enter the oil as it reaches the outward limit of its stroke during each rotation of the crank. Under ordinary conditions, this oil is liable to become exhausted or so nearly so that the pitman will not enter it, and in this event, the parts of the engine will not be properly lubricated, resulting in great injury to the mechanism. Heretofore, so far as I am aware, no absolutely reliable provision has been made for overcoming this difficulty.

In my improved construction, I provide an auxiliary receptacle so arranged and connected with the crank case that the oil rises in the auxiliary device to the same level as in the said case. Within this auxiliary receptacle is located a float which rises and falls with the oil within the receptacle and consequently with the level of the oil in the case. This float may be made of any suitable material. If made hollow, it may consist of sheet metal, as aluminum. In any event, the float is circumferentially grooved to receive a spring metal ring which is divided and adapted to be sprung into the groove in the float, whereby, as the float rises and falls, the ring also has a corresponding movement. The auxiliary receptacle in which the float is located is provided with three sets of contacts located at different elevations within the receptacle. The uppermost set of contacts is engaged by the ring of the float when the oil is at its normal or maximum level within the tank. These contacts are connected with a white light which is conspicuously arranged on the machine as upon the dash board in front of the chauffeur. When the oil falls below the normal or maximum level whereby the metal ring is disengaged from the uppermost set of contacts and engages the set next below, the white light will be extinguished and the circuit will be completed through a red light from which the chauffeur will know that the oil is getting low within the case and needs replenishing. If, however, this fact is not observed by the chauffeur or if by reason of carelessness on his part the oil is not replenished but continues to fall still lower, the ring of the float will become disengaged from the contacts through the medium of which the circuit is completed through the red light and the ring of the float will be brought into engagement with the lowermost set of contacts, in which event the red light will also be extinguished and the circuit in which the magneto is located will be short circuited through the ring of the float and consequently will not pass through the spark plug of the engine and the latter will cease to operate.

Having briefly outlined my improved construction, I will proceed to describe the same in detail, reference being made to the accompanying drawing in which is illustrated an embodiment thereof.

In this drawing, Figure 1 is a vertical section taken through a cylinder of the engine and the tank or crank case, into which the pitman extends during the operation of the engine, showing also in section an auxiliary receptacle in communication with the crank case, together with the magneto and the electric circuits employed in connection with my improvement. Fig. 2 is a sectional view in detail of the auxiliary receptacle, shown on a larger scale than in Fig. 1. Fig. 3 is a cross section taken on the line 3—3, Fig. 2, viewed in the direction of the arrow.

The same reference characters indicate the same parts in all the views.

Let the numeral 5 designate the cylinder of an internal combustion engine. Within this cylinder is a piston 6 with which is connected a pitman 7 whose outer extremity is connected with the wrist pin 8 of a crank 9 with which the operating shaft 10 of the engine is provided. Connected with the cylinder 5 is a casing 12 which incloses the pitman and the crank. This casing contains a quantity of oil. The uppermost dotted line 13 may be considered the maximum level of the oil within the crank case; while the lower dotted line 14 may be considered the medium level, while the level 15 indicated by the shading in Fig. 1 indicates that the oil is so low as to be of no benefit in lubricating the mechanism.

Arranged in suitable proximity to the engine is a relatively small receptacle 16 whose lower extremity is connected to the lower extremity of the crank case by an open ended pipe 17, the receptacle 16 being so arranged that its bottom is approximately in the same horizontal plane with the bottom of the crank case. In any event, the oil in the auxiliary receptacle will, of course, rise to the same level as that in the crank case.

Within the receptacle 16 are three sets of contacts arranged one above another. The members of the uppermost set of contacts are each designated 18 and consist of plates which are segmental in cross section and arranged on opposite sides of the receptacle in which they are stationary. These contacts are also insulated from the outer shell or casing 19 of the receptacle by an interposed layer 20 of insulating material. With these contacts, however, are respectively connected the inner extremities of the metal parts 21 and 22 of binding screws 23 and 24. The metal parts of these binding screws are insulated from the shell 19 of the casing by coverings 25 of insulating material.

From the metal part of the binding screw 23 an electrical conductor 65 leads to a pole 26 of an electric source 27, from whose opposite pole 28 a conductor 29 leads to a point 30 of a conductor 31. This conductor 31 leads to a white light 32 and a red light 33. From the white light a conductor 34 leads to the metal part of the binding screw 24.

Within the receptacle 16 is a float 35 which is surrounded by a spring metal ring 36 which engages with contacts 18 when the oil 37 within the receptacle is of sufficient height for the purpose. (See Fig. 2). Assuming that the float is in the position shown in Fig. 2 the circuit will be completed through the white light 32 by virtue of the circuit connections just described.

Below the contacts 18 and insulated therefrom are two other contacts 38 with which are connected the metal parts 39 and 40 of the binding screws 41 and 42. Now, if it be assumed that the oil within the receptacle 16 has fallen so low that the metal ring 36 is disengaged from the contacts 18 and engages the contacts 38, the current may be said to pass from the pole 28 of the battery 27 through the conductor 29 to the point 30 of the conductor 31, and thence through the red light, whence it will pass through a conductor 43 to the metal part of the binding post 42 and thence through one of the contacts 38 and the ring 36 to the other contact 38 and thence through the metal part 39 of the binding screw 41 and the short conductor 44 to the conductor 65 and thence to the pole 26 of the battery, completing the circuit through the red light 33.

Again, if the oil continues to fall within the receptacle 16 until the ring 36 of the float no longer engages the contacts 38 and is brought into engagement with the lowermost set of contacts 45 of the receptacle, the red light will be extinguished and the current will be short circuited from the magneto 46 by way of a conductor 47, a binding screw 48, a conductor 45, the metal ring 36, another conductor 45, a binding screw 49 and a conductor 50, to the ground 51. The other pole of the magneto is grounded by wire 52.

Normally, the current passes from one pole of the magneto through a wire 53 to the spark plug 54 and thence through the frame of the machine and a wire 55 to the ground, as shown at 56. It is evident, however, that when the float is in the lowermost position in the receptacle 16 that the magneto current will be short circuited as just explained, since the current will take the easiest path to the ground.

From the foregoing description, it will be understood that the fluctuation of the oil within the receptacle 16 corresponds with the change of level of the oil in the crank case 12. It will also be understood that when the white light is burning, the oil in the crank case will be at the highest level indicated, or that designated in the drawing by the dotted line 13. Again, when the white light is extinguished and the red light is ignited, the oil in the crank case will be at the level indicated by the dotted line 14. Again, when the red light is extinguished and the oil has fallen so low in the receptacle 16 as to short-circuit the magneto current, the oil will also be at the level indicated by the numeral 15 in the crank case and consequently so low that the pitman and crank pin cannot reach it during the rotation of the operating shaft of the motor, hence provision is made for automatically stopping the engine when the oil has reached this level, since if the engine were allowed to continue operation, serious damage would result by reason of non-lubrication of the operating parts of the machine.

In the event that the float 35 is made of metal, and this is believed thoroughly practicable, it will be unnecessary that the spring ring 36 which, as illustrated in the drawing, is divided as shown at 57, shall have its extremities in actual contact in order to complete the circuit through the various sets of contacts in the receptacle 16. However, if the float is made of insulating material, it will be understood that the extremities of the spring ring must be in contact in order to properly bridge the space between the individual members of the several sets of contacts.

It should also be explained that the construction is such that the float and its spring ring will readily follow the fluctuations of the oil within the receptacle 16. It should also be explained that the oil 37 employed in the crank case and the receptacle 16, is an insulator whereby the current can only pass between the binding screws connected with the two members of each set of contacts, when the float is in such position that the spring ring either alone or in conjunction with the float, bridges the space in an electrical sense, between the contacts.

Having thus described my invention, what I claim is;

1. The combination with the oil-containing crank case of an internal combustion engine, of an auxiliary receptacle in communication with the crank case to allow the oil to flow freely to the receptacle and maintain the same level therein as in the crank case, the receptacle having contact plates mounted therein upon opposite sides, a circuit in which said contacts are located, a float within the receptacle and arranged to electrically bridge the contacts when the oil is at a predetermined level, and means located in the circuit for automatically indicating the changes of the oil level in the auxiliary receptacle and the crank case.

2. The combination with an oil-containing crank case of an internal combustion engine, of an auxiliary receptacle in communication with the crank case to allow the oil to freely enter the receptacle, a number of sets of spaced electrical contacts in the receptacle, circuits in which the sets of contacts are respectively located, translating devices located in the respective circuits, a float located within the receptacle, and means surrounding the periphery of said float for electrically bridging the space between the individual members of the several sets of contacts as the oil level fluctuates.

3. The combination with the oil-containing crank case of an internal combustion engine, of an auxiliary receptacle in communication with the crank case to allow the oil to flow freely to the receptacle and maintain the same level therein as in the crank case, the receptacle having contact plates mounted therein upon its side, a circuit in which said contacts are located, a float within the receptacle and arranged to electrically bridge the contacts when the oil is at a predetermined level, and means located in the circuit for automatically indicating the changes of the oil level in the auxiliary receptacle and the crank case.

4. The combination with an oil-containing crank case of an internal combustion engine, of an auxiliary receptacle in communication with the crank case to allow the oil to freely enter the receptacle, a number of sets of spaced electrical contacts in the receptacle, circuits in which the sets of contacts are respectively located, translating devices located in the respective circuits, a float located within the receptacle, and means mounted on said float and projecting beyond its periphery for bridging the space between the individual members of the several sets of contacts as the oil level fluctuates.

In testimony whereof I affix my signature in presence of two witnesses.

ROY J. BRADBURY.

Witnesses:
 MAZE KIRBY,
 A. EBERT O'BRIEN.